United States Patent [19]
Tison et al.

[11] 3,903,632
[45] Sept. 9, 1975

[54] LONG LINE HAULING AND REEL STORAGE SYSTEM

[75] Inventors: Kenneth F. Tison, Seattle; Olivier L. Tremoulet, Jr., Edmonds, both of Wash.

[73] Assignee: Marine Construction & Design Co., Seattle, Wash.

[22] Filed: Apr. 25, 1974

[21] Appl. No.: 464,062

[52] U.S. Cl. .................................. 43/6.5; 43/27.4
[51] Int. Cl.² ............................................ A01K 89/00
[58] Field of Search .......... 43/27.4, 8, 6.5; 254/137, 254/138

[56] References Cited
UNITED STATES PATENTS

| | | | |
|---|---|---|---|
| 1,175,602 | 3/1916 | Chidley | 43/27.4 |
| 3,201,890 | 8/1965 | Griggs | 43/27.4 |
| 3,626,630 | 12/1971 | Tison | 43/27.4 |
| 3,635,441 | 1/1972 | Haines | 43/8 |
| 3,722,126 | 3/1973 | Whipple et al. | 43/6.5 |

*Primary Examiner*—Warner H. Camp
*Attorney, Agent, or Firm*—Christensen, O'Connor, Garrison & Havelka

[57] ABSTRACT

A long line hauling and reel type storage system is disclosed wherein separately powered but coordinated hauling and reeling at adjacent stations may be performed reliably at a rapid rate with the aid of gangion-delaying and positioning means which facilitates hook placement on the storage reel spokes by an operator.

15 Claims, 3 Drawing Figures

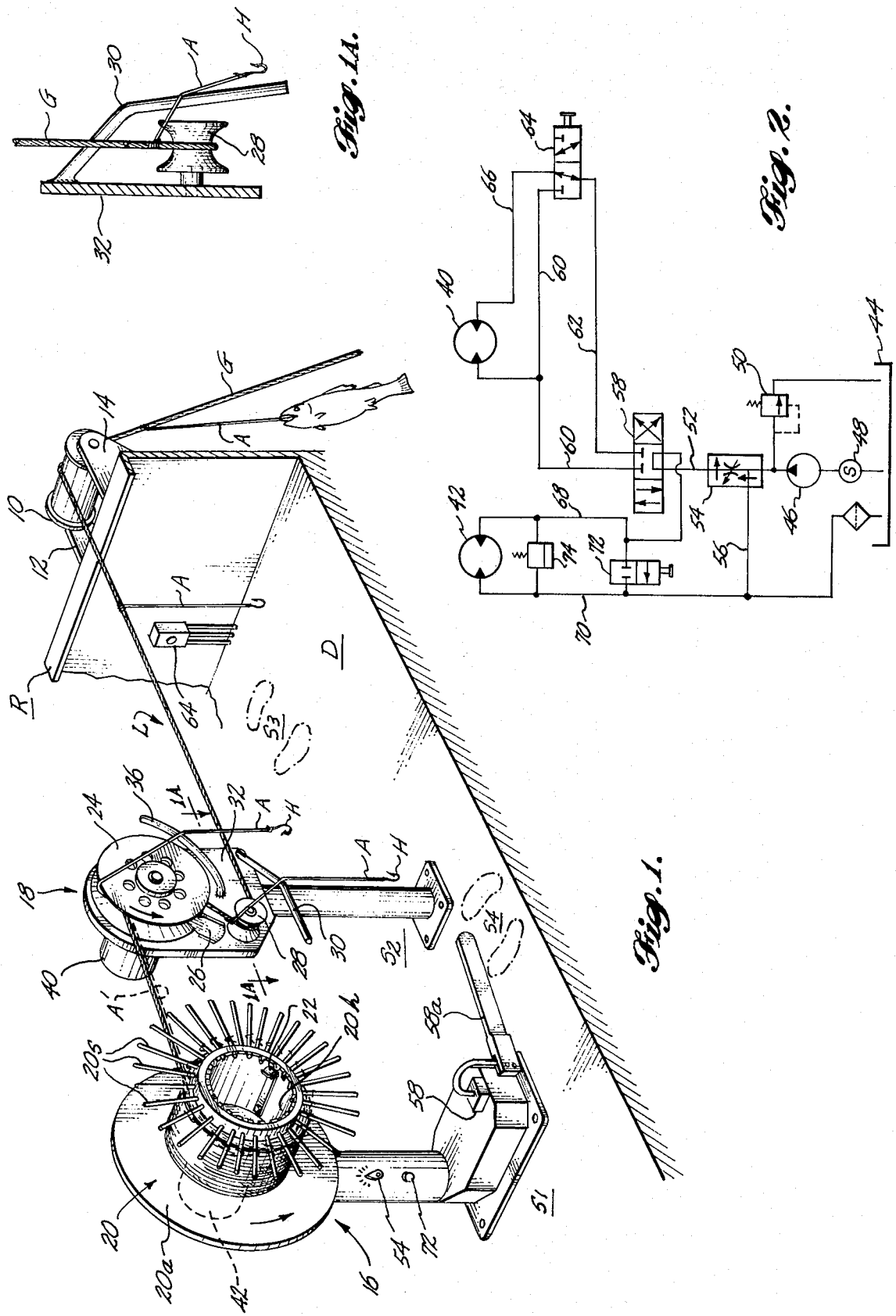

LONG LINE HAULING AND REEL STORAGE SYSTEM

BACKGROUND OF THE INVENTION

This invention relates to improvements in apparatus and methods for hauling and storing long lines, and more particularly to the more efficient utilization of long line storage reels of the type disclosed in co-pending application Ser. No. 242,843, filed Apr. 10, 1972 for reissue of U.S. Pat. No. 3,626,630 (Dec. 14, 1971) and in an improved form in co-pending application Ser. No. 356,060 filed Apr. 30, 1973 (other Tison U.S. case) and now U.S. Pat. No. 3,841,011. The invention is herein illustratively described by reference to the presently preferred embodiment thereof; however, it will be recognized that certain modifications and changes may be made therein without departing from the essential features involved.

It is found when the ground line is hauled in directly by driven rotation of the reel at desired hauling speeds difficulties arise from time to time in properly stretching out the gangions and placing the gangion hooks securely on the storage spokes of the reel. The task is exacting and the timing is critical in order to avoid subsequent dislodgement and fouling of the hooks. It is also found that the heavy tension in the ground line wound on the reel under direct hauling tension multiples in repeated wraps around the reel hub. This produces accumulative crushing forces of compression in the reel requiring a very strong and heavy construction.

Moreover under varying hauling conditions load tension in the ground line being wrapped on the reel is not constant. At times the load tension is extremely high, such as when the long line is caught on the bottom, or the catch is particularly heavy. At times the load is light such as when the ground line breaks yet its remnant must be wound in to the bitter end. Such conditions of widely varying line tension tend to cause problems in achieving a uniform wrap on the reel and uniformly stable and secure retention of the hooks on the storage spokes.

With some ground line materials, particularly those slippery and elastic, winding of the ground line under heavy tension, even with hooks and gangions properly stowed in the winding operation initially, can create problems in resetting the long line as it pays out from the storage reel. As tension is relaxed in the leading portion of the line paying off the reel turns of the ground line, like an uncoiling loaded spring, slip back on the reel, slackening and placing the connected gangions in disarray. This condition also can foul the turns of the ground line or the hooks, or both, delaying the resetting operation.

A broad object hereof is to provide a method and apparatus for rapidly hauling in long lines and providing for their effective storage on a reel which not only expedites and facilitates proper placement of hooks on the storage reel spokes by an operator, but which also eliminates the problems of high or varying tension created in the ground line as it is being wound up on the storage reel.

A further object of this invention is to provide a powered long line hauling and storage means wherein the long line is stored under substantially constant or acceptably limited workable tension on the storage reel so as to permit use of any type of ground line material irrespective of coefficient of friction or elasticity of the material.

A related object is to mechanically isolate application of hauling load force to the ground line from the application of winding force creating acceptable tension in the ground line as it enwraps the storage reel, and to achieve this isolation on a continuing basis while maintaining hauling speed in the process. A related object is to provide such a hauling and storage system wherein the hook-connected ends of the advancing gangions are retarded or held in a relatively stationary position and accessible to be picked up by the operator for placement on the reel without the necessity of reducing hauling speed to make this possible.

BRIEF DESCRIPTION OF INVENTION

In the present improved long line hauling and storage reel system, separately powered drives for the hauler and reeling means enable the hauler to haul the ground line in a positive manner at a hauling rate which is substantially independent of variations in line loading or the requirements of reeling. It further enables spooling or winding up the long line in a manner subordinated to the hauling function as such, but under separately controlled tension automatically maintained within acceptable limits irrespective of hauling conditions. Additionally, line control means operatively associated with the hauler interposes a brief delay or holding action on the gangions in their advancement to the reeling means while simultaneously presenting the gangion accessibly to an operator for expeditious placement of the hooks on the storage reel spokes with the gangions stretched forwardly under the desired stabilizing tension.

As a further feature the hauling means combines the hauling, delaying and gangion accessible positioning functions. This it does in the illustrated hauler by running the ground line first around a sheave which guides it through a bend angle exceeding 90° into a reverse or divergently directed path of approach to a powered drive sheave. The latter has a tapered groove in which the ground line is frictionally wedged for driving purposes. The drive sheave guides the ground line around a reversely directed bend to approach the adjacent reeling means. In the succession of reverse bends and transit between sheaves the system effectively holds or delays the gangions. During such delay, laterally diverging gangion deflector bars underlying the ground line paths of approach to the respective sheaves deflect the gangions laterally, clear of the sheaves and into positions wherein they are accessible to an operator.

A primary control for the hauler and reeler drive motors assures that the reeler is turning when the hauler is operating. Pressure relief for the reeler motor limits its torque. The working diameter of the hauler V-groove sheave, remaining constant despite progressively increasing diameter of line being wrapped on the storage reel, assures constant hauling rate, although adjustability of that rate is readily provided whether the drive system is hydraulic or of some other form. An independent shutoff for the hauler motor is available to the remote operator stationed in position shaking the fish as they come overboard. A separate bypass for the spooler motor may be operated to release the reel for free rotation, such as when setting the long line. If one or more wraps of the ground line need to be withdrawn for correcting a gangion or hook position on the reel this may be effected by the operator pulling against the constant light winding torque maintained on the windup reel, or by deenergizing the reel drive motor altogether, if desired. With the reel drive motor deenergized the reel may either free-spool or remain stationary, and the hauler may be utilized independently to pull in buoy lines without useless turning of the reel.

These and other features, objectives and advantages of the invention will become more fully evident as the description proceeds by reference to the accompanying drawings.

DESCRIPTION OF THE DRAWINGS

FIG. 1 is an isometric view of the long line hauling and reel storage system in its preferred embodiment as installed aboard a fishing vessel.

FIG. 1A is a horizontal, transverse sectional view taken on line 1A—1A in FIG. 1 to show the cooperative relationship between the first guide sheave in the hauler and the associated gangion deflector bar.

FIG. 2 is a schematic diagram of the hydraulic motor drive and control system employed in FIG. 1.

DETAILED DESCRIPTION OF ILLUSTRATED EMBODIMENT

Referring to the drawings, a fishing vessel is represented by a portion of its deck D shown fragmentarily along with the side rail and supporting bulwark R. A guide roller 10 is mounted by brackets 12 and 14 on the side rail with suitable fair lead or directing rollers (not shown) to confine the incoming long line L during hauling. Any suitable form of lead-in guiding device may be used for this purpose. Preferably, led in at rail height, line L is drawn in a generally horizontal path over the deck toward the powered line reeling or windup mechanism 16 at station S1. In advancing towards the station S1, the long line traverses a line-directing delay means, in this case embodied in line hauler 18.

Hauler 18 is mounted on a support post 18a at staion S2 situated proximate to the station S1. Long line gangions A extended from the ground line G at intervals along the length of the ground line have one or more hooks H fastened to their free ends in the usual manner. The spacing and length of the gangions and the materials used in the gangions and in the ground lines may vary for different kinds of fishing or in accordance with preference. Some of these different line types have presented problems in using windup reels or spools for storage following prior practice for reasons previously discussed.

The combined line-delaying and hauler mechanism 18 stationed adjacent the line windup spooling or reeling apparatus 16 is interposed in the path of and acts upon the ground line as it travels from the incoming guide roll 10 toward the windup reel 20. Working space is allowed at station S3 between the rail R and the hauler 18 for an operator to shake the fish from the hooks as they come over the rail and to untangle any gangions that do not hang free. Mutual proximity between the hauler and spooler stations S2 and S1 respectively, allows another person stationed at an intermediate location S4 to utilize, monitor and control the operation of these two cooperating devices while manually placing the hooks H on the appropriate radial reel spokes 20s. The construction and function of the storage reel 20 is preferably as described in the aforesaid co-pending application Ser. No. 356,060, filed Apr. 30, 1973, and in an earlier form in application Ser. No. 242,843 to reissue U.S. Pat. No. 3,626,630. The reel comprises a flange 20a at one end and the series of radial transversely coplanar spokes 20s at the opposite end. The intervening hub 20h of tubular form is continuously wrapped by the ground line and gangions as the reel is rotated. In placing the hooks on the reel spokes the gangions are stretched forwardly toward and around the hub 20h in order to select that spoke which holds some tension in the gangion, hence some retention pressure on the hook.

Spool 20 is removably mounted for driven rotation on a horizontal axis. For this purpose reeling device 16 has an annular rotary support on which the reel is held by a latch mechanism 22, substantially as disclosed in application Ser. No. 242,843.

The operator at station S4 in attendance upon the hauler and reeling devices 18 and 16 operates the hydraulic controls and replaces filled reels with empty ones as needed. During hauling the operator's main function, of course, is to grasp the gangion hooks H as the gangions are traversing the line delaying hauler 18, stretch the gangions forwardly toward reel 20 as shown by dotted line A', and immediately secure the associated gangion hook upon the proper reel spoke 20s. These steps must be done quickly with the ground line in motion. If the rate has to be reduced, or the hauling stopped each time a gangion is to be set on the reel, hauling becomes too slow and time consuming considering that each long line typically carries several hundred gangions. It is therefore desirable to permit the operator to perform these functions easily, reliably and without tiring. The mechanism for winding up the ground line should also allow tolerance for mistakes by permitting reversal of the winding motion momentarily if need be to correct a hook placement with the hauler stopped without the necessity of deenergizing the motor which torques the windup reel 20. Preferably the hauler runs at substantially constant speed under normal conditions independent of variations in loading tension in the ground line. Such variations are found to vary widely. For example, when the long line is snagged the hauler load tension may be a maximum. At the opposite extreme when the ground line is broken and its broken remnant must be drawn in, the ground line tension exerted on the hauler may be a minimum. While the hauler exerts the necessary hauling force, it also acts as a positive drag or brake against which the reeling device must work in winding up the hauled line. Therefore a continuous but light tension can be maintained in the ground line by the reel drive means at all times.

In the preferred form of line hauler mechanism 18 the hauler also provides a delaying or holding function with respect to the gangions. This is achieved by the manner in which the hauler sheaves temporarily bend and reverse the path direction of the advancing ground line traversing the hauler. During the interval of time when the line undergoes these reversals, the suspended gangions passing the hauler are held more or less horizontally stationary and accessible to the operator at station S4 for grasping them individually in turn for placement on the storage reel.

In order to accomplish both the hauling and delaying functions, the hauler comprises a relatively large-diameter drive sheave 24 having a tapered groove into which the ground line G is wedgingly engaged to gain the necessary frictional force for overcoming load tension in the ground line. Sheave 24 is rotatively mounted on one side of an upright base plate 32. Sheave drive motor 40 is positioned on the opposite side of this base plate. A line splitter or wedge 26 entering the backside of the hauler drive sheave groove is provided to "peel" or deflect the ground line out of the groove should the line fail to leave the sheave 24 but start a second turn winding itself around the turning drive sheave. Normally this splitter, however, is not contacted by the ground line because the windup tension exerted in the stretch of ground line between the hauler and the reeling device 16 by the drive motor which turns the storage reel 20 is sufficient to pull the ground line from the groove. The angle of wrap of the ground line around the powered drive sheave 24, typically about 150° or 160°, is sufficient that the frictional wedging force of the line into the drive sheave groove may be small while allowing the drive sheave to exert great pull on the ground line.

Typically, the hauler drive sheave 24 and the take up reel 20 are at about the same height above deck level, which is preferably about chest height for the operator standing at station S4. Prior to reaching the drive sheave 24 the ground line traveling from the guide in roller 10 passes in a reverse bend around an idler guide sheave 28. The latter's vertical plane of rotation is coincident with that of the drive sheave 24 and that of reel 20. The guide sheave 28 is reduced in diameter intermediate its ends to help insure that the ground line remains on this sheave in passing around it. The two sheaves 28 and 24 bend the ground line successively in relatively opposite directions, the sheave 28 through an angle exceeding 90° and preferably approaching 180°, and the drive sheave 24 through an angle of the same order of magnitude. In traveling between the successive sheaves 28 and 24 the ground line not only has a reverse component of horizontal travel (i.e., away from reel 20) but an upward component as well. This momentary reversal of motion acting on each gangion in passing through the hauler provides an effective holding or delay action thereon wherein the gangion is presented in a fairly constant access position in relation to the deck station S4. However, it is also necessary and desirable during this interval to keep the gangion free of the ground line and of the sheaves 28 and 24 respectively so that the operator at station S4, in grasping the gangion in his hand may immediately swing it into the forwardly stretched position A' without encumbrance and also so that the gangion hook H will not foul on the ground line or any of the parts of the line-delaying hauler.

The aforementioned objective of maintaining the gangion free and accessible as it traverses the hauler is preferably accomplished by providing a deflector bar 30 beneath the ground line in its path approaching the first guide sheave 28. One end of this bar is mounted on the hauler base member 32 from which the bar 30 angles laterally outward in relation to the plane of rotation of the guide sheave 28 in the direction of motion of the ground line. The bar 30 thus encounters and deflects the suspended gangion laterally outwardly beyond the end face of the guide sheave 28 as it reaches and passes the latter. This is shown in the top view of FIG. 1A. Thus, the gangion is cleared of the guide sheave 28 as its end fastened to the ground line runs around that sheave.

Rounding the guide sheave 28 the upwardly moving fastened end of the same gangion next enters the groove of drive sheave 24. A second deflector bar 36 on base plate 32 is stationed beneath the stretch of ground line moving upwardly between the two sheaves 28 and 24 and is also angled laterally outwardly in relation to the rotational plane of drive sheave 24 in the direction of travel of the ground line approaching that sheave. As in the case of the deflector bar 30, so the deflector bar 36 also encounters and deflects the gangion laterally outward beyond the drive sheave 24 so as to clear the ground line over the edge of the sheave rather than to permit the ground line to enter and track around the sheave groove. This condition is shown in FIG. 1 wherein one of the gangions A is passing over the end of the sheave 24 while being held deflected outwardly from the side thereof by the deflector bar 36.

In passing drive sheave 24 the gangion now starts moving again in the generally horizontal direction toward the windup reel 20 and in so doing swings back toward the region of the guide sheave 28. By this time the operator normally has grasped the gangion for application to the windup reel. However, in the event the operator has not done so, the gangion nevertheless will sweep past the guide sheave 28 and will be prevented from fouling on it by the deflecting action of the deflector bar 30. Hence, the mechanism is inherently designed to avoid fouling of the gangions or hooks independently of operator function.

With reference to both FIGS. 1 and 2, hauler drive sheave 24 is driven by hydraulic motor 40 mounted on the backside of frame plate 32, and the rotative support for windup reel 20 is driven by hydraulic motor 42 suitably mounted on the powered reel apparatus 16. Preferably, both motors are driven by pressurized hydraulic fluid in a common hydraulic system. In this system pump 46 draws fluid from reservoir 44 through a suction filter 48, with protection against excess pressure being provided by a relief valve 50 in a line leading from the discharge side of the pump 46 back to the reservoir 44. In the main hydraulic supply line 52 leading from the pump 46 there is a flow control regulator 54 of conventional design including a return line 56 leading back to the reservoir 44. This regulator 54 incorporates valving elements operable to maintain a substantially constant rate of flow in the line 52 regardless of pressure variations. The adjustment setting of the flow control 54 determines operating speed of the hydraulic motor 40 driving the hauler sheave 24.

A four-way main control valve 58 is connected between the outlet of regulator 54 and the lines 60 and 62. This main control valve is pedal controlled as illustrated in FIG. 1 wherein the pedal 58a, available to the operator at station S4, may be placed in one of three control positions. In its intermediate position depicted in FIG. 2, the valve 58 blocks flow in both of the lines 60 and 62 and hence locks the hauler drive motor 40 against rotation. In each of its other two positions established by pedal 58a, primary control valve 58 causes the hauler motor 40 to turn drive sheave 40 either forwardly or in reverse. In either such direction of rotation, the hauler motor tends to drive the hauler sheave 24 at substantially constant speed determined by the setting of the flow control device 54. It thereby controls hauling speed at a rate substantially independent of hauling load tension variations in the ground line G.

Motor drive line 62 leads to a separate three-way secondary control valve 64 having two outlet ports connected to respectively opposite sides of the hauler motor 40 through lines 66 and 60. Valve 64 is preferably mounted adjacent operator station S3, such as on the side of the rail bulwark of the vessel (FIG. 1). Its presence at that location enables the operator at this station to interrupt the hauling operation if necessary to facilitate his job of shaking fish from the gangions and seeing to it that the incoming gangions are not tangled or wrapped up on the ground line before they reach the hauler. In its illustrated setting, valve 64 permits the hauler motor to run under control of the operator at station S4. In its alternate setting, valve 64 assures stopping and locking of the hauler drive motor irrespective of the setting of valve 58.

Reel drive hydraulic motor 42 is hydraulically connected at one side to flow controller 54 through line 68 and at its opposite side to the reservoir 44 through line 70. A normally closed bypass valve 72 is connected between lines 68 and 70. Normally it permits the reel drive motor 42 to rotate whenever there is pressure available in the system from the pump 46. In its second or alternate setting, however, the valve 72 bypasses the motor 42 and enables it to free spool. In this latter setting of the valve 72 ground line can be drawn back off the storage reel without encountering even the light drive torque normally exerted on the reel by motor 42. Alternatively, the motor 42 can be rendered inoperative by the resetting of valve 72 under conditions when it is desirable to operate the hauler without the spooler rotating, such as when using the hauler to pull in a buoy line. A pressure relief or limiting valve 74 connected in shunt across the motor 42 has a limiting pressure such as 250 pounds per square inch (as against a normal maximum system pressure delivered by pump 46 of perhaps 2,000 pounds per square inch established by relief valve 50), so as to establish the maximum torque deliverable by motor 42 to the take up reel at a safe, usable value for winding in the long line on the reel 20. However, the reel drive motor 42 is designed to tend to rotate at a speed which, related to the controlled speed of motor 40, is sufficient that tension is always maintained in the ground line between the reel 20 and the hauler sheave 24. This tension is effectively regulated at a substantially constant value determined by the setting of the relief or regulating valve 74. The instant the reaction force in the ground line exerted on the reel 20 restrains the motor 42 from turning the reel, the bypass valve 74 relieves and thereby limits the hydraulic pressure applied to the motor.

It will therefore be appreciated that the hydraulic drive system for the spooler and hauler mechanisms, the controls and the specific forms and arrangements of the various operating portions of the system, while shown and described in the preferred form, may be modified or varied while remaining within the scope of the invention concept as defined in the claims which follow.

What is claimed is:

1. Long line hauling and reeling apparatus for fishing with a ground line having spaced gangions extended therefrom and at least one hook at the end of each gangion, comprising in combination with a rotatable line storage and pay-out spool having a central line storage hub with a plurality of circumferentially spaced hook-retainer spokes at one end projecting radially outwardly in relation to the hub: powered line hauling means operatively engageable with the ground line in running relationship therewith to haul in the long line under varying load tension in the ground line thereof, powered line reeling means operatively positioned in relation to the powered line hauling means and operable to support and rotate the line storage spool for drawing and winding up the ground line from said powered line hauling means under winding tension in the ground line substantially less than and independent of said load tension, and holding means positioned adjacent the reeling means temporarily delaying advancement of the gangions successively at a location adjacent the reeling means.

2. The apparatus defined in claim 1 wherein the holding means comprises first and second rotary sheaves serially engaged by the ground line in running relationship therewith, said first and second sheaves being so positionally related to the line reeling means as to deflect and thereby delay the ground line in successive reverse bends around said sheaves in passing to the reel means.

3. The apparatus defined in claim 2, including gangion deflector means operatively associated with said sheaves for deflectively offsetting the gangions laterally in relation to said sheaves and thereby maintaining the individual gangions free of the sheaves as the respective portions of ground line from which said gangions extend are passing around said sheaves.

4. The apparatus defined in claim 3 wherein the line hauling means comprises the holding means, one of said sheaves being power driven and being formed to frictionally engage the ground line for hauling the same.

5. The apparatus defined in claim 4 wherein said one sheave has a tapered groove in which the ground line is wedgingly engaged and is positioned generally above and in a vertical rotational plane common with that of the other sheave, additional guide means stationed remote from the line hauling means generally in said vertical plane and positioned for directing the ground line to the line hauling means in a generally horizontal path, and wherein the gangion deflector means comprise a first deflector mounted immediately beneath said path ahead of said other sheave, said first deflector diverging in angled relationship to said vertical plane in the direction toward said other sheave, and a second deflector mounted between the sheaves in a position immediately underlying the ground line passing therebetween and angled divergingly from said plane in the direction toward said first sheave.

6. In a system for winding up the ground line and gangions of a long line on a reel during hauling of the long line from a set, including reel means rotatively positioned at a first station to wind up the ground line, including means to receive and individually hold the gangion hooks separately placed manually thereon for ready release of the hooks individually during subsequent unwinding of the long line from the reel, and line-directing delay means operable in running engagement with the ground line at a location ahead of and adjacent to the reel means to interpose line-delaying reversal in the progress of the ground line toward the reel means, temporarily delaying arrival of the gangions at the reel means said reel means and delaying means being so relatively positioned that an operator stationed at the reel means can grasp the gangions while they are traversing said delaying means.

7. The system defined in claim 6 wherein the line-directing delay means includes first and second rotary line guide elements, relatively positioned with space between them, around which the long line passes successively in moving toward the reel means, the first rotary guide element being positioned for bending the path of the approaching ground line through an angle greater than ninety degrees for movement across said space to the second element, and the second element being positioned for bending the path of the ground line oppositely before it runs therefrom toward the reel means, said line-directing delay means being formed and arranged for maintaining the gangions separated from the ground line and rotary guide elements in passing said rotary guide elements.

8. The system defined in claim 7 wherein the first rotary guide element comprises a rotary sheave and the second rotary guide element comprises a powered drive sheave having a tapered groove therein in which the ground line is wedgingly received to exert hauling force by friction on the ground line by powered rotation of the powered drive sheave.

9. The system defined in claim 7 wherein the line-directing delay means includes gangion deflector elements associated with respective rotary guide elements and underlying such respective guide elements in the path of gangions approaching the respective drive elements, said gangion deflector elements being angled laterally outward from the respectively associated rotary guide element divergently in relation to the direction of travel of such gangions as each approaches and passes each guide element.

10. The system defined in claim 7 further including hydraulic motors drivingly connected respectively to the rotary drive sheave and the reel means, a source of pressurized hydraulic fluid, means for delivering such fluid to said hydraulic motors for simultaneous operation thereof, the hydraulic motor driving the reel means tending to rotate said reel means to wind up the ground line at a speed exceeding the hauling speed effected by such drive sheave under all degrees of accumulation of ground line and gangions on the reel means, and thereby maintaining tension in the ground line against the restraint imposed thereon by the drive sheave, and torque limiting means operatively associated with hydraulic motor driving the reel means limiting the drive torque of said motor exerted on said reel means at selected maximum value independent of load tension in the ground line being hauled by the second rotary guide element.

11. The system defined in claim 10 and valve means operable to remove pressurized hydraulic fluid from the hydraulic motor turning the drive sheave, while locking such motor against rotation, and while maintaining hydraulic pressure in the other motor, thereby maintaining tension in the ground line extending between the reel means and drive sheave.

12. The system defined in claim 10, including primary hydraulic control means for the drive sheave hydraulic motor positioned accessibly to an operator stationed adjacent to the line-directing delay means to control starting and stopping of such latter motor, wherein the inhaul guide means is spaced from the line-directing delay means by a distance affording a working station for a second operation in which to shake fish from the gangion hooks in the approach to such delay means, and secondary hydraulic control means for the drive sheave hydraulic motor positioned accessibly to said working station to permit starting and stopping of such motor by the second operator when otherwise rendered operative by the primary hydraulic control means.

13. The method of hauling from a set and storing long lines on a reel means on which the ground line and gangions may be wound and the gangion hooks individually secured separately for successive release during subsequent unwinding of the ground line and gangions from the reel means in resetting of the long line, said method comprising hauling in the ground line under power selectively applied and at controlled rate by utilizing drive means making running frictional driving contact with the ground line at a first station, winding up ground line on the reel means under power at a second station as it runs through the drive means at the first station, maintaining controlled tension in the ground line being wound on the reel means independent of application of power to the drive means and of variations in load tension in the ground line being hauled by said drive means, and securing the hooks on the reel means individually for subsequent independent release, while the ground line and gangions are being wound on the reel means.

14. The method defined in claim 13 including temporarily retarding progress of the gangions toward the reel means at a location adjacent to the first station while maintaining the controlled hauling rate of the ground line by the drive means.

15. The method defined in claim 14 wherein the retarding of progress of the gangions toward the reel means is effected by interposing at least one sinuous reverse bend in a stretch of the ground line running toward the reel means.

* * * * *